US011005665B2

(12) United States Patent
Lu et al.

(10) Patent No.: US 11,005,665 B2
(45) Date of Patent: May 11, 2021

(54) BLOCKCHAIN-BASED SECURE TRANSACTION METHOD, ELECTRONIC DEVICE, SYSTEM AND STORAGE MEDIUM

(71) Applicant: One Connect Smart Technology Co., Ltd. (Shenzhen), Guangdong (CN)

(72) Inventors: Frank Yifan Chen Lu, Guangdong (CN); Pengfei Huan, Guangdong (CN); Yu Zhang, Guangdong (CN); Yuxiang Huang, Guangdong (CN)

(73) Assignee: One Connect Smart Technology Co., Ltd. (Shenzhen), Shenzhen (CN)

( * ) Notice: Subject to any disclaimer, the term of this patent is extended or adjusted under 35 U.S.C. 154(b) by 353 days.

(21) Appl. No.: 16/305,073

(22) PCT Filed: Jun. 30, 2017

(86) PCT No.: PCT/CN2017/091246
§ 371 (c)(1),
(2) Date: Nov. 28, 2018

(87) PCT Pub. No.: WO2018/137316
PCT Pub. Date: Aug. 2, 2018

(65) Prior Publication Data
US 2020/0374135 A1     Nov. 26, 2020

(30) Foreign Application Priority Data

Jan. 24, 2017   (CN) .......................... 201710060336.0

(51) Int. Cl.
*H04L 9/32*        (2006.01)
*G06Q 10/10*       (2012.01)
(Continued)

(52) U.S. Cl.
CPC ........... *H04L 9/3263* (2013.01); *G06Q 10/10* (2013.01); *G06Q 20/3829* (2013.01);
(Continued)

(58) Field of Classification Search
CPC ..... H04L 9/3229; H04L 9/008; H04L 9/3263; H04L 2209/38; G06Q 20/3829;
(Continued)

(56) References Cited

U.S. PATENT DOCUMENTS

2015/0288665 A1*  10/2015  El Emam ................ H04L 9/008
                                                  713/171
2017/0104726 A1*  4/2017  Camenisch ......... H04L 63/0428
(Continued)

OTHER PUBLICATIONS

Juels, Ari, Ahmed Kosba, and Elaine Shi. "The ring of gyges Investigating the future of criminal smart contracts." Proceedings of the 2016 ACM SIGSAC Conference on Computer and Communications Security. 2016 (Year: 2016).*

(Continued)

*Primary Examiner* — Syed A Zaidi

(57) ABSTRACT

A method includes: a supervisor writes a digital certificate and a corresponding first public key into an intelligent contract of a blockchain corresponding to an asset type to be supervised, so that all institutions with asset accounts under the asset type can obtain the first public key of the supervisor through the digital certificate, so as to generate an additive homomorphic key for homomorphic encryption of the balance of an asset account; when checking the balance of a new account of a transactor, the supervisor obtains a public key in a public-private key pair corresponding to the new account, generates an additive homomorphic key based on a supervision private key corresponding to the supervisor and a predetermined key exchange protocol and the public key in the public-private key pair according to the key exchange protocol, and decrypts the encrypted balance of the new account, using the generated additive homomorphic key.

20 Claims, 8 Drawing Sheets

(51) Int. Cl.
*G06Q 20/38* (2012.01)
*H04L 9/00* (2006.01)
*H04L 9/08* (2006.01)
*G06Q 20/10* (2012.01)
*G06Q 20/40* (2012.01)
*G06Q 40/02* (2012.01)
*G06Q 40/06* (2012.01)

(52) U.S. Cl.
CPC ....... *G06Q 20/38215* (2013.01); *H04L 9/008* (2013.01); *H04L 9/0841* (2013.01); *G06Q 20/102* (2013.01); *G06Q 20/4037* (2013.01); *G06Q 40/02* (2013.01); *G06Q 40/06* (2013.01); *G06Q 2220/00* (2013.01); *H04L 2209/38* (2013.01)

(58) Field of Classification Search
CPC ............. G06Q 20/4037; G06Q 20/102; G06Q 2220/00; G06Q 40/06; G06Q 40/02; G06Q 10/10
USPC ........................................................ 713/156
See application file for complete search history.

(56) References Cited

U.S. PATENT DOCUMENTS

2017/0352031 A1* 12/2017 Collin .................... G06Q 30/06
2018/0343114 A1* 11/2018 Ben-Ari .................... H04L 9/06
2019/0140822 A1*  5/2019 Xie ....................... G06Q 20/223
2019/0140848 A1*  5/2019 Dontov ................... H04L 9/006

OTHER PUBLICATIONS

Zhang, Fan, et al. "Town crier: An authenticated data feed for smart contracts." Proceedings of the 2016 aCM sIGSAC conference on computer and communications security. 2016. (Year: 2016).*
NPL Search Terms (Year: 2021).*
The extended European Search Report of counterpart European Patent Application No. 17894061.5 dated Aug. 31, 2020.
Yunsen Wang et al., Designing Privacy-Preserving Blockchain Based Accounting Information Systems, SSRN Electronic Journal, May 24, 2017, pp. 1-68.
Gaby G. Dagher et al., Provisions: Privacy-preserving proofs of solvency for Bitcoin exchanges, International Association for Cryptologic Research, Oct. 26, 2015, pp. 1-33, vol. 20151026:184716.

* cited by examiner

| A supervisor writes a digital certificate into an intelligent contract of a blockchain corresponding to an asset type to be supervised, so that all institutions with asset accounts under the asset type can obtain a first public key of the supervisor through the digital certificate. | S1 |

| Based on a public-private key pair corresponding to each asset account managed by the institution, a predetermined key exchange protocol and the first public key, institution equipment of the institution generates an additive homomorphic key corresponding to each asset account according to the key exchange protocol, encrypts the balance of each asset account by using the corresponding additive homomorphic key, and broadcasts the encrypted balance to each node of the blockchain through the intelligent contract of the blockchain. | S2 |

| When the institution initiates a transaction, the institution equipment encrypts the balance of a new account of a transactor for transaction through the corresponding additive homomorphic key, and broadcasts the encrypted balance of the new account to each node of the blockchain through the intelligent contract of the blockchain. | S3 |

| When checking the balance of the new account of the transactor, the supervisor obtains a public key in the public-private key pair corresponding to the new account, generates an additive homomorphic key according to the key exchange protocol based on a supervision private key corresponding to the supervisor and the predetermined key exchange protocol and the public key in the public-private key pair, and decrypts the encrypted balance of the new account by using the generated additive homomorphic key. | S4 |

Fig. 2

BLOCKCHAIN-BASED SECURE TRANSACTION METHOD, ELECTRONIC DEVICE, SYSTEM AND STORAGE MEDIUM

PRIORITY CLAIM

Based on the Paris Convention, this application claims the priority of the Chinese patent application with the application number CN201710060336.0, filed on Jan. 24, 2017 and entitled "Blockchain-Based Secure Transaction Method and System", the entire content of which is hereby incorporated by reference.

TECHNICAL FIELD

The invention relates to the technical field of blockchains, in particular to a blockchain-based secure transaction method, electronic device, system and computer-readable storage medium.

BACKGROUND ART

Blockchain technology has the characteristics of decentralization and non-tampering of information. By using the blockchain technology, multi-party transaction events (e.g., transfer transactions and payment transactions) can be realized. For example, if bank A and bank B conduct a transaction on a blockchain, then all other nodes on the blockchain will know about the transaction, and other participants can confirm the accuracy of the transaction together and prevent information tampering. However, since there is no absolute authoritative institution node in this transaction method, it is necessary to carry out collective verification on each transaction, leading to the disadvantage that the transaction of transaction participants has no privacy, and the account of one institution may be tracked by institutions on other nodes, thus causing the risk of information disclosure.

In order to solve the above problem, a scheme of additive homomorphic encryption protection is adopted in the industry to solve the problem of information disclosure in blockchain transactions. However, there are still shortcomings: for example, when the account balance of an account is protected by additive homomorphic encryption, only the owner of a homomorphic encryption key can know the actual balance of the account, which makes it difficult for the supervision department to supervise the liquidity of financial assets. If the owner of the assets is required to pass the key for homomorphic encryption to the supervisor in some form, errors and/or potential security risks are likely to occur due to the complicated processing steps of a system, and the efficiency is low.

To sum up, it has become an urgent technical problem to apply the blockchain technology to the trading scene and effectively ensure the security of trading information, the high efficiency of transaction processing and the supervision of accounts by supervisors.

SUMMARY OF THE INVENTION

The object of the invention is to provide a blockchain-based secure transaction method, electronic device, system and computer-readable storage medium, so as to effectively ensure the security of trading information of blockchain-based transactions, the high efficiency of transaction processing and the supervision of accounts by supervisors.

In order to achieve the above object, the invention provides a blockchain-based secure transaction method, and the blockchain-based secure transaction method includes the steps of:

S1, a supervisor writes a digital certificate into an intelligent contract of a blockchain corresponding to an asset type to be supervised, so that all institutions with asset accounts under the asset type can obtain a first public key of the supervisor through the digital certificate;

S2, based on a public-private key pair corresponding to each asset account managed by the institution, a predetermined key exchange protocol and the first public key, institution equipment of the institution generates an additive homomorphic key corresponding to each asset account according to the key exchange protocol, encrypts the balance of each asset account by using the corresponding additive homomorphic key, and broadcasts the encrypted balance to each node of the blockchain through the intelligent contract of the blockchain;

S3, when the institution initiates a transaction, the institution equipment encrypts the balance of a new account of a transactor for transaction through the corresponding additive homomorphic key, and broadcasts the encrypted balance of the new account to each node of the blockchain through the intelligent contract of the blockchain; and S4, when checking the balance of the new account of the transactor, the supervisor obtains a public key in the public-private key pair corresponding to the new account, generates an additive homomorphic key according to the key exchange protocol based on a supervision private key corresponding to the supervisor and the predetermined key exchange protocol and the public key in the public-private key pair, and decrypts the encrypted balance of the new account by using the generated additive homomorphic key.

In order to achieve the above object, the invention also provides an electronic device, the electronic device includes a memory and a processor connected with the memory, wherein the memory stores a blockchain-based secure transaction system which can run on the processor, and the blockchain-based secure transaction system implements the following steps when executed by the processor:

S1, a supervisor writes a digital certificate into an intelligent contract of a blockchain corresponding to an asset type to be supervised, so that all institutions with asset accounts under the asset type can obtain a first public key of the supervisor through the digital certificate;

S2, based on a public-private key pair corresponding to each asset account managed by the institution, a predetermined key exchange protocol and the first public key, institution equipment of the institution generates an additive homomorphic key corresponding to each asset account according to the key exchange protocol, encrypts the balance of each asset account by using the corresponding additive homomorphic key, and broadcasts the encrypted balance to the intelligent contract of each node of the blockchain through the intelligent contract of the blockchain;

S3, when the institution initiates a transaction, the institution equipment encrypts the balance of a new account of a transactor for transaction through the corresponding additive homomorphic key, and broadcasts the encrypted balance of the new account to the intelligent contract of each node of the blockchain through the intelligent contract of the blockchain; and S4, when checking the balance of the new account of the transactor, the supervisor obtains a public key in the public-private key pair corresponding to the new account, generates an additive homomorphic key according to the key exchange protocol based on a supervision private key corresponding to the supervisor and the predetermined key exchange protocol and the public key in the public-private key pair, and decrypts the encrypted balance of the new account by using the generated additive homomorphic key.

In order to achieve the above object, the invention also provides a blockchain-based secure transaction system, and the blockchain-based secure transaction system includes:

a writing module, configured for writing a digital certificate into an intelligent contract of a blockchain corresponding to an asset type to be supervised, so that all institutions with asset accounts under the asset type can obtain a first public key of the supervisor through the digital certificate to generate an additive homomorphic key for encrypting the balance of an asset account and the balance of a new account of the asset account after a transaction;

a first encryption module, configured for generating an additive homomorphic key corresponding to each asset account based on a private key in a public-private key pair corresponding to each asset account managed by the current institution, a predetermined key exchange protocol and the first public key according to the key exchange protocol, encrypting the balance of each asset account by using the corresponding additive homomorphic key, and broadcasting the encrypted balance to the intelligent contract of each node of the blockchain through the intelligent contract of the blockchain;

a second encryption module, configured for encrypting the balance of the new account of each asset account of a transactor for transaction through the corresponding additive homomorphic key when the institution initiates a transaction, and broadcasting the encrypted balance of the new account to the intelligent contract of each node of the blockchain through the intelligent contract of the blockchain; and a decryption module, configured for obtaining a public key in the public-private key pair corresponding to the new account, generating an additive homomorphic key according to the key exchange protocol based on a supervision private key corresponding to the supervisor and the predetermined key exchange protocol and the public key in the public-private key pair, and decrypting the encrypted balance of the new account by using the generated additive homomorphic key when the supervisor checks the balance of the new account of the transactor.

In order to achieve the above object, the invention also provides a computer-readable storage medium on which a blockchain-based secure transaction system is stored, and when executed by a processor, the blockchain-based secure transaction system implements the following steps:

S1, a supervisor writes a digital certificate into an intelligent contract of a blockchain corresponding to an asset type to be supervised, so that all institutions with asset accounts under the asset type can obtain a first public key of the supervisor through the digital certificate;

S2, based on a public-private key pair corresponding to each asset account managed by the institution, a predetermined key exchange protocol and the first public key, institution equipment of the institution generates an additive homomorphic key corresponding to each asset account according to the key exchange protocol, encrypts the balance of each asset account by using the corresponding additive homomorphic key, and broadcasts the encrypted balance to the intelligent contract of each node of the blockchain through the intelligent contract of the blockchain;

S3, when the institution initiates a transaction, the institution equipment encrypts the balance of a new account of a transactor for transaction through the corresponding additive homomorphic key, and broadcasts the encrypted balance of the new account to the intelligent contract of each node of the blockchain through the intelligent contract of the blockchain; and S4, when checking the balance of the new account of the transactor, the supervisor obtains a public key in the public-private key pair corresponding to the new account, generates an additive homomorphic key according to the key exchange protocol based on a supervision private key corresponding to the supervisor and the predetermined key exchange protocol and the public key in the public-private key pair, and decrypts the encrypted balance of the new account by using the generated additive homomorphic key.

The invention has the beneficial effects that the invention generates a symmetric key (i.e., the additive homomorphic key) jointly owned by the asset owner and the supervisor through the key exchange protocol, and uses the symmetric key as an encryption and decryption key of additive homomorphic encryption, so that the supervisor can decrypt the encrypted balance of the account, and other unrelated parties cannot know the actual balance of the account, thus effectively ensuring the security of the account and supervising the account, and improving the efficiency of transaction processing.

BRIEF DESCRIPTION OF THE DRAWINGS

FIG. 2 is a flowchart of a first embodiment of a blockchain-based secure transaction method of the present invention;

DETAILED DESCRIPTION OF THE INVENTION

The principles and features of the present invention will be described below with reference to the accompanying drawings. The examples given are only for the purpose of explaining the present invention and are not intended to limit the scope of the present invention.

Figure 1:
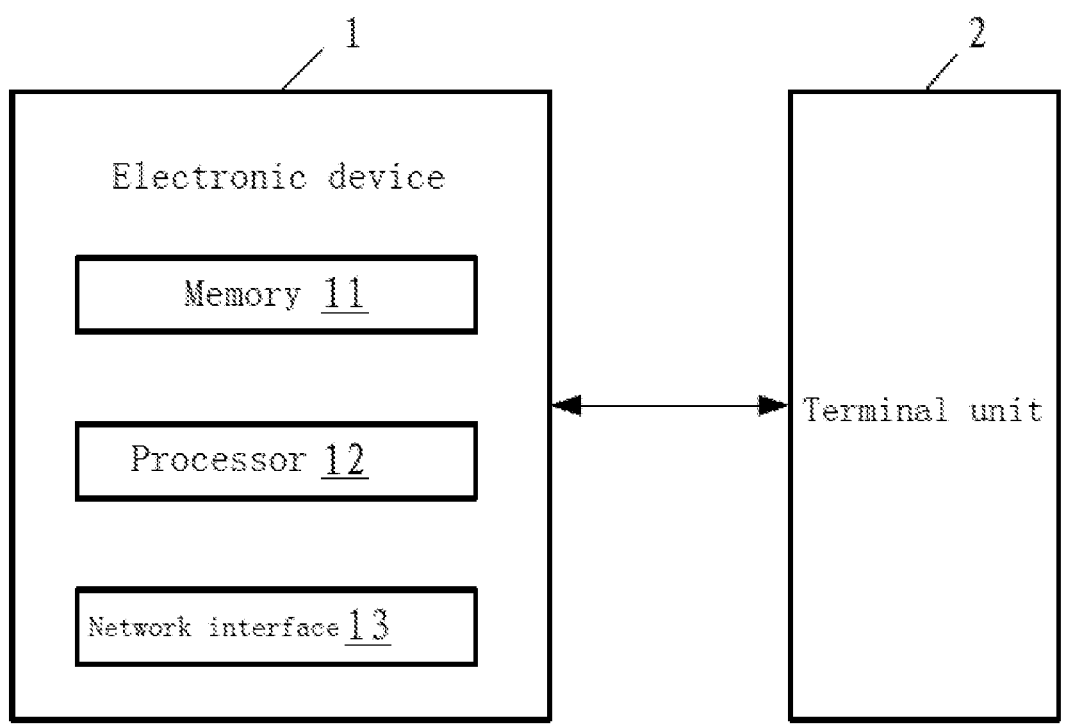
FIG. 1 is a schematic diagram of an alternative application environment of various embodiments of the present invention.

As shown in FIG. 1 which is a schematic diagram of an alternative application environment of various embodiments of the present invention, the schematic diagram of the application environment diagram includes an electronic device 1 and a terminal unit 2. Data interaction can be achieved between the electronic device 1 and the terminal unit 2 through suitable technologies such as a network and the near field communication technology.

The terminal unit 2 may be, but is not limited to, any kind of electronic product capable of achieving man-machine interaction with a user through a keyboard, mouse, remote controller, touch panel or voice control device, for example, a mobile device such as a personal computer, tablet computer, smart phone, personal digital assistant (PDA), game machine, Internet protocol television (IPTV), intelligent wearable device and navigation device, or a fixed terminal such as a digital TV, desktop computer, laptop and server.

The electronic device 1 is a device capable of automatically carrying out numerical calculation and/or information processing according to a preset or stored instruction. The electronic device 1 may be a computer, a single network server, a server group composed of a plurality of network servers, or a cloud composed of a large number of hosts or network servers based on cloud computing which is one type of distributed computing, or a super virtual computer composed of a plurality of loosely coupled computer sets.

In this embodiment, the electronic device 1 may include, but is not limited to, a memory 11, a processor 12, and a network interface 13 which can be communicatively connected to each other through a system bus, wherein a blockchain-based secure transaction system which can be run on the processor 12 is stored in the memory 11. It should be noted that FIG. 1 only shows an electronic device 1 with components 11-13, but it should be understood that it is not required to implement all the components shown, and more or fewer components can be implemented instead.

The memory 11 includes an internal storage and at least one type of readable storage medium. The internal storage provides caching for the operation of the electronic device 1. The readable storage medium may be a nonvolatile storage medium such as flash memory, hard disk, multimedia card, card type memory (e.g., SD or DX memory), random access memory (RAM), static random access memory (SRAM), read only memory (ROM), electrically erasable programmable read only memory (EEPROM), programmable read only memory (PROM), magnetic memory, magnetic disk and optical disk. In some embodiments, the readable storage medium may be an internal storage unit of the electronic device 1, such as a hard disk of the electronic device 1. In other embodiments, the nonvolatile storage medium may also be an external storage device of the electronic device 1, such as a plug-in hard disk, smart media card (SMC), secure digital (SD) card and flash card equipped on the electronic device 1. In this embodiment, the readable storage medium of the memory 11 is usually configured to store an operating system and various application software installed in the electronic device 1, such as a program code of the blockchain-based secure transaction system in one embodiment of the present invention. In addition, the memory 11 may also be configured to temporarily store various types of data which have been or will be output.

The processor 12 may be a central processing unit (CPU), controller, microcontroller, microprocessor, or other data processing chips in some embodiments. The processor 12 is generally configured to control the overall operation of the electronic device 1, for example, to perform control and processing related to data interaction or communication with the terminal unit 2. In this embodiment, the processor 12 is configured to run the program code stored in the memory 11 or process data, for example, to run the blockchain-based secure transaction system.

The network interface 13 may include a wireless network interface or a wired network interface, and the network interface 13 is generally configured to establish communication connection between the electronic device 1 and other electronic equipment. In this embodiment, the network interface 13 is mainly configured to connect the electronic device 1 with the terminal unit 2, and to establish a data transmission channel and communication connection between the electronic device 1 and the terminal unit 2.

The blockchain-based secure transaction system is stored in the memory 11 and includes at least one computer-readable instruction stored in the memory 11, and the at least one computer-readable instruction can be executed by the processor 12, so as to implement the blockchain-based secure transaction method of various embodiments of the present invention. As will be described later, the at least one computer-readable instruction may be divided into different logic modules depending on the function of each part.

The blockchain-based secure transaction system generates a symmetric key (i.e., additive homomorphic key) jointly owned by an asset owner and a supervisor through a key exchange protocol, and uses the symmetric key as an encryption and decryption key of additive homomorphic encryption, so that the supervisor can decrypt the encrypted balance of an account, and other unrelated parties cannot know the actual balance of the account, thus effectively ensuring the security of the account and supervising the account, and improving the efficiency of transaction processing. In addition, by deploying a public key of the supervisor and public key exchange protocol parameters on a blockchain intelligent contract, a user who owns or is about to own the assets can generate a homomorphic encryption key only shared by the user and the supervisor according to the public key of the supervisor and the public key exchange protocol parameters. Thus, while ensuring the privacy of the account, different supervisors can be set for different types of assets on different intelligent contracts, and the service compatibility and service expansion convenience of a blockchain are greatly improved.

As shown in FIG. 2 which is a flowchart of one embodiment of a blockchain-based secure transaction method of the present invention, and the blockchain-based secure transaction method includes the steps of:

S1, A supervisor writes a digital certificate into an intelligent contract of a blockchain corresponding to an asset type to be supervised, so that all institutions with asset accounts under the asset type can obtain a first public key of the supervisor through the digital certificate.

In this embodiment, the supervisor writes the digital certificate issued thereto by Certificate Authority (CA) into the intelligent contract of the blockchain corresponding to the asset type to be supervised. There are multiple asset types. For example, there are current assets and long-term assets according to consumption period, and long-term assets can be further classified according to the specific form; there are tangible assets and intangible assets based on whether there is a physical form; or by combining several classification standards, assets can be divided into current assets, long-term investments, fixed assets, intangible assets, deferred assets and the like, and the asset type to be supervised is selected from these asset types.

After the supervisor writes the digital certificate into the intelligent contract of the blockchain corresponding to the asset type to be supervised, all users or institutions (e.g., financial institutions and fund institutions) with asset accounts under the asset type to be supervised can obtain a first public key of the supervisor through the digital certificate written in the intelligent contract, and the first public key is configured for homomorphic encryption.

In addition, before the supervisor writes the digital certificate into the intelligent contract of the blockchain corresponding to the asset type to be supervised, CA signs on the basis of the first public key corresponding to the supervisor and the predetermined key exchange protocol, so as to generate the digital certificate and issue the digital certificate to the supervisor.

S2, Based on each asset account managed by the institution, a predetermined key exchange protocol and the first public key, institution equipment of the institution generates an additive homomorphic key corresponding to each asset account according to the key exchange protocol, encrypts the balance of each asset account by using the corresponding additive homomorphic key, and broadcasts the encrypted balance to each node of the blockchain through the intelligent contract of the blockchain.

In this embodiment, each asset account corresponds to the predetermined key exchange protocol, and each asset account and the predetermined key exchange protocol both have a corresponding public-private key pair. The institution equipment of the institution generates the additive homomorphic key corresponding to each asset account according to the key exchange protocol based on the public-private key pair corresponding to each asset account and the predetermined key exchange protocol (e.g., Diffie-Hellman protocol, national secret SM2 protocol) and the first public key of the supervisor. Specifically, the public-private key pair is first obtained, then a private key in the public-private key pair is obtained, and the additive homomorphic key corresponding to each asset account is generated based on the private key and the first public key of the supervisor according to the key exchange protocol, wherein the additive homomorphic key is used as an encryption and decryption key of homomorphic encryption, and the additive homomorphic key is a symmetric key (i.e., both parties sending and receiving data must use the same key to encrypt and decrypt plaintext).

The institution uses the corresponding additive homomorphic key to encrypt the balance of each asset account. For example, if a user or institution has two accounts b1 and b2 under the asset type to be supervised, the balance of the account b1 is encrypted using the additive homomorphic key corresponding to the account b1, and the balance of the account b2 is encrypted using the additive homomorphic key corresponding to the account b2. Finally, the institution informs each node of the blockchain of the balance, after homomorphic encryption, of each account under the asset type to be supervised through the intelligent contract of the blockchain, specifically, the balance after homomorphic encryption is written to a shared asset book on each node of the blockchain through the intelligent contract of the blockchain.

After homomorphic encryption of the balance of each asset account, only the supervisor with the additive homomorphic key and the asset owner can know the balance of the corresponding asset account. The asset account can be regarded as an old user and corresponds to a new user described below.

S3, When the institution initiates a transaction, the institution equipment encrypts the balance of a new account of a transactor for transaction through the corresponding additive homomorphic key, and broadcasts the encrypted balance of the new account to each node of the blockchain through the intelligent contract of the blockchain.

In this embodiment, the user or institution can create a new asset account for transaction, and the created new asset account is called the new account in this embodiment. For example, during transaction, bank x changes 100 bills on an account number 001 to 400 bills, and the user or institution can deposit 400 on an account number 002 and then create a new account 003 on which −300 is deposited. The account number 002 is an asset account with the account balance being subjected to homomorphic encryption and is regarded as an old account as described above, and the account number 003 is a new account the balance of which is also subjected to homomorphic encryption.

In this embodiment, when a user or institution in the blockchain initiates a transaction under the above-mentioned asset type, for example, A transfers money to B, the user or institution performs homomorphic encryption on the balance of the new account for transaction by each transactor through the additive homomorphic key corresponding to the asset account of each transactor, and broadcasts the balance of the new account for transaction by each transactor after homomorphic encryption to each node of the blockchain through the intelligent contract, so that other users or institutions on each node of the blockchain can be aware of the transaction (but cannot know the balance of the new account for transaction).

S4, When checking the balance of the new account of the transactor, the supervisor obtains a public key in the public-private key pair corresponding to the new account, generates an additive homomorphic key according to the key exchange protocol based on a supervision private key corresponding to the supervisor and the predetermined key exchange protocol and the public key in the public-private key pair, and decrypts the encrypted balance of the new account by using the generated additive homomorphic key.

When the supervisor needs to check the balance of the new account of a transactor, the supervisor obtains the public key in the public-private key pair corresponding to the new account of the transactor, for example, the supervisor can obtain the broadcasted public key in the public-private key pair corresponding to the new account of the transactor through the intelligent contract, or the public key itself is a predetermined portion of the corresponding account number (e.g., the public key may be the N1-N2 number segment of the corresponding account number, and N1 and N2 are both natural numbers greater than 0). Then the additive homomorphic key is generated according to the key exchange protocol by means of the supervision private key corresponding to the supervisor and the predetermined key exchange protocol and the public key in the public-private key pair corresponding to the account, and the generated additive homomorphic key can decrypt the balance of the new account after the account is encrypted.

Compared with the prior art, this embodiment generates a symmetric key (i.e., additive homomorphic key) jointly owned by the asset owner and the supervisor through the key exchange protocol, and uses the symmetric key as an encryption and decryption key of additive homomorphic encryption, so that the supervisor can decrypt the encrypted balance of an account, and other unrelated parties cannot know the actual balance of the account, thus effectively ensuring the security of the account and supervising the account, and improving the efficiency of transaction processing. In addition, by deploying the public key of the supervisor and public key exchange protocol parameters on the blockchain intelligent contract, a user who owns or is about to own the assets can generate a homomorphic encryption key only shared by the user and the supervisor according to the public key of the supervisor and the public key exchange protocol parameters. Thus, while ensuring the privacy of the account, different supervisors can be set for different types of assets on different intelligent contracts, and the service compatibility and service expansion convenience of the blockchain are greatly improved.

Figure 3:
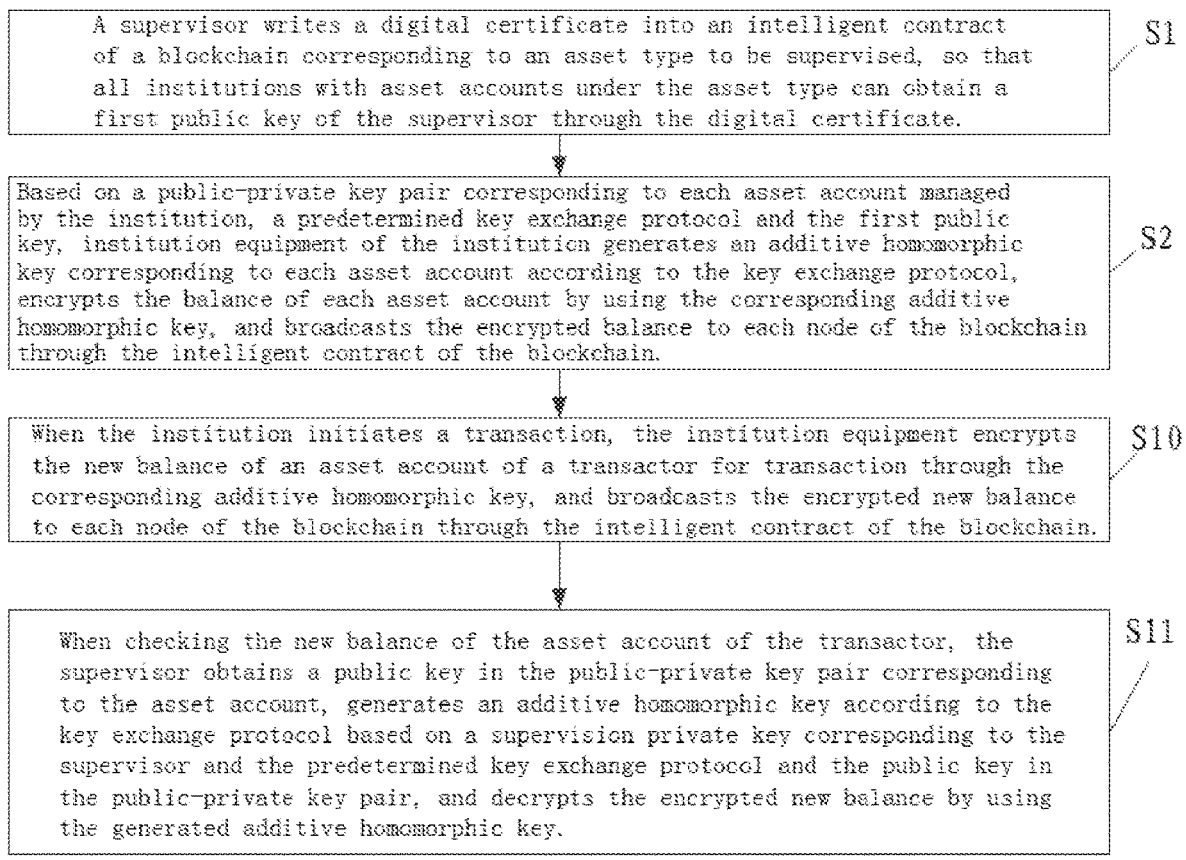
FIG. 3 is a flowchart of a second embodiment of the blockchain-based secure transaction method of the present invention.

In a preferred embodiment, as shown in FIGS. 3, S3 and S4 can be replaced with S10 and S11 described below respectively:

S10, when the institution initiates a transaction, the institution equipment encrypts the new balance of an asset account of a transactor for transaction through the corresponding additive homomorphic key, and broadcasts the encrypted new balance to the intelligent contract of each node of the blockchain through the intelligent contract of the blockchain; and S11, when checking the new balance of the asset account of the transactor, the supervisor obtains a public key in the public-private key pair corresponding to the asset account, generates an additive homomorphic key according to the key exchange protocol based on a supervision private key corresponding to the supervisor and the predetermined key exchange protocol and the public key in the public-private key pair, and decrypts the encrypted new balance by using the generated additive homomorphic key.

The difference between this embodiment and the embodiment shown in FIG. 1 is that in this embodiment, the transactor does not create a new asset account for transaction, but uses an existing old account for transaction, in this case, the account balance after transaction is a new balance relative to the original balance. In this embodiment, the encryption process and decryption process for the new balance are consistent with those in the embodiment shown in FIG. 1, and will not be repeated here.

Figure 4:
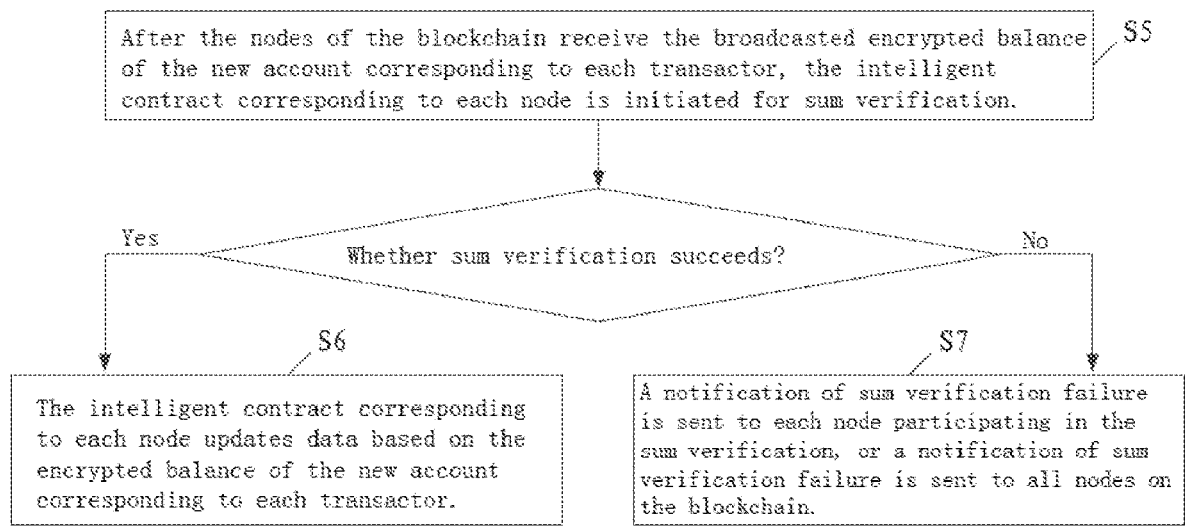
FIG. 4 is a flowchart of a third embodiment of the blockchain-based secure transaction method of the present invention.

In a preferred embodiment, as shown in FIG. 4, on the basis of the above embodiment shown in FIG. 2, S3 is followed by:

S5, after the nodes of the blockchain receive the broadcasted encrypted balance of the new account corresponding to each transactor, the intelligent contract corresponding to each node is initiated for sum verification;

S6, if the sum verification, by the intelligent contract corresponding to each node, of the encrypted balance of the new account corresponding to each transactor succeeds, the intelligent contract corresponding to each node updates data based on the encrypted balance of the new account corresponding to each transactor; and S7, if the sum verification, by the intelligent contract corresponding to a certain node, of the encrypted balance of the new account corresponding to a certain transactor fails, a notification of sum verification failure is sent to each node participating in the sum verification, or a notification of sum verification failure is sent to all nodes on the blockchain.

In this embodiment, sum verification is to verify whether the sum of the balances of all nodes before transaction is equal to the sum of the balances of all nodes after transaction. For example, there is an effective algorithm $\oplus$ such that $E(x+y)=E(x)\oplus E(y)$ or $x+y=D(E(x)\oplus E(y))$ is true, wherein the effective algorithm is an additive homomorphic encryption verification algorithm which does not leak the balance x and y of the account while sum verification of the account is achieved.

If the sum verification, by the intelligent contract corresponding to each node, of the encrypted balance of the new account corresponding to each transactor succeeds, the intelligent contract corresponding to each node updates data based on the encrypted balance of the new account corresponding to each transactor; and if the sum verification, by the intelligent contract corresponding to a certain node, of the encrypted balance of the new account corresponding to a certain transactor fails, a notification of sum verification failure is sent to each node participating in the sum verification, or a notification of sum verification failure is sent to all nodes on the blockchain.

Figure 5:
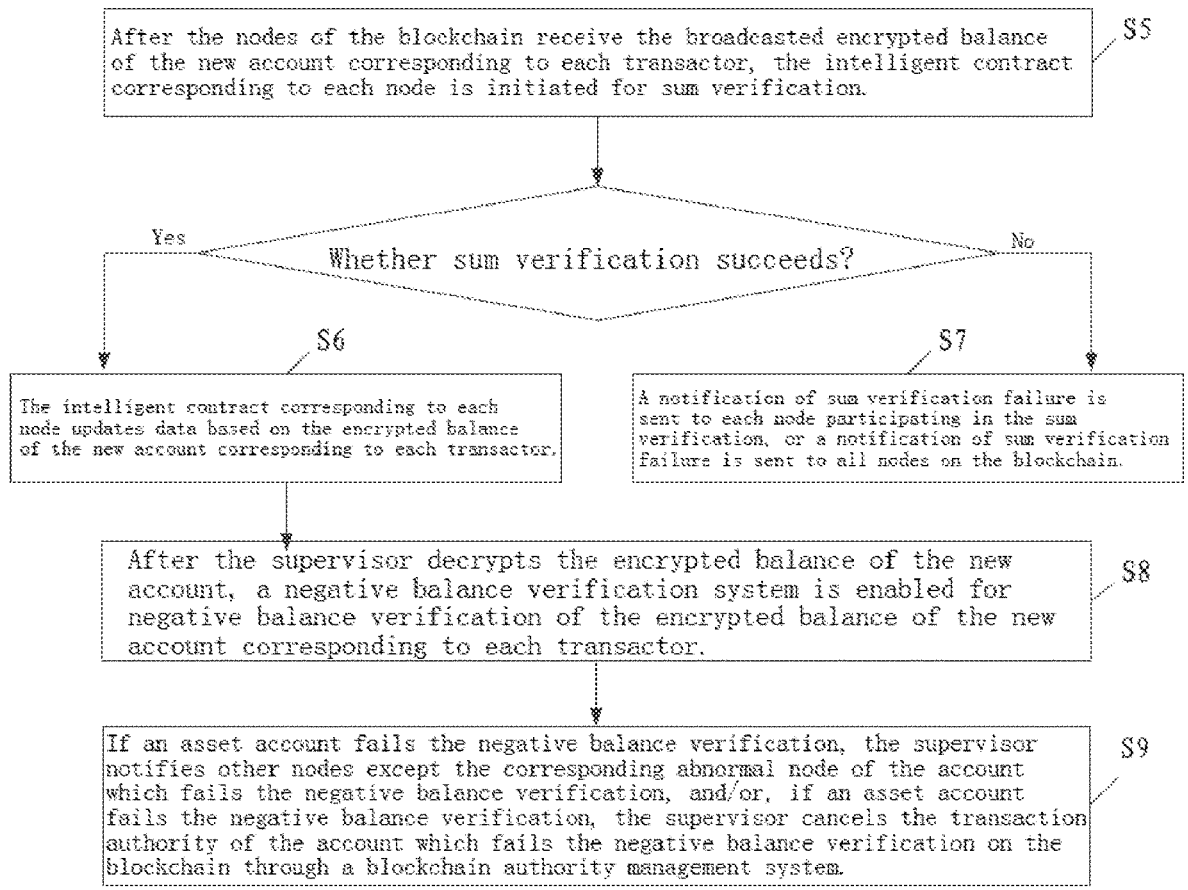
FIG. 5 is a flowchart of a fourth embodiment of the blockchain-based secure transaction method of the present invention.

In a preferred embodiment, as shown in FIG. 5, on the basis of the above embodiment shown in FIG. 4, S5 is followed by:

S8, after the supervisor decrypts the encrypted balance of the new account, a negative balance verification system is enabled for negative balance verification of the encrypted balance of the new account corresponding to each transactor; and S9, if an asset account fails the negative balance verification, the supervisor notifies other nodes except the corresponding abnormal node of the account which fails the negative balance verification, and/or, if an asset account fails the negative balance verification, the supervisor cancels the transaction authority of the account which fails the negative balance verification on the blockchain through a blockchain authority management system.

In this embodiment, since the account and the amount of each transaction participated by the same node are recorded, false balance verification can effectively prevent a user from changing the balance of a certain sub-account by sharing balance among sub-accounts at a certain node, thus cheating in the sum verification, for example, a user can cheat in the verification by creating an account number with negative numbers: bank x changes 100 bills on an account number 001 to 400 bills: the user can create an account number 002 and deposit 400 on the account number 002, and then deposit −300 on a new account number 003; thus the negative balance verification is required. (Note: negative numbers are usually caused by mod overflow when passwords are used, for example, when mod is 300, 400 mod 300 is equal to 100.)

If the sum verification, by the intelligent contract corresponding to each node, of the encrypted balance of the new account corresponding to each transactor succeeds, the supervisor decrypts the encrypted balance of the new account corresponding to each transactor, and after decryption, the negative balance verification system is enabled for negative balance verification of the decrypted balance of the new account corresponding to each transactor; if an account fails the negative balance verification, the supervisor determines the account, and notifies other nodes except the abnormal blockchain node of the abnormal condition of the account, and/or, if an account fails the negative balance verification, the supervisor cancels the transaction authority of the abnormal account on the blockchain through the blockchain authority management system.

Figure 6:
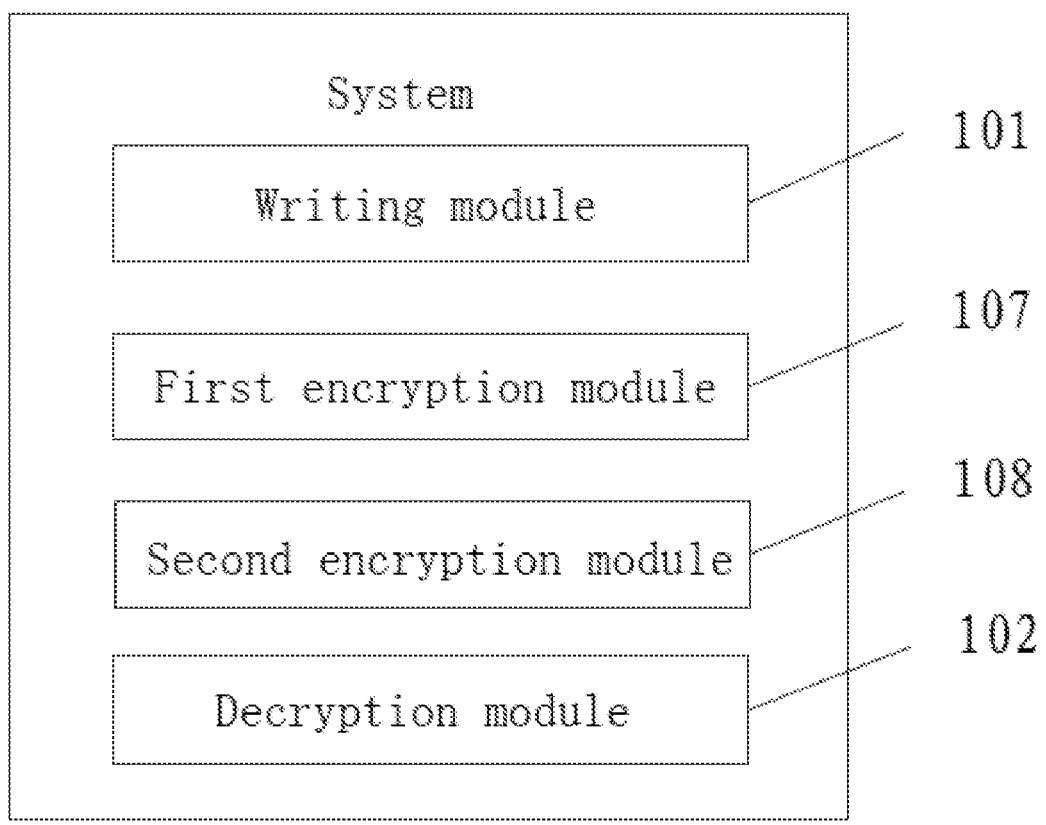
FIG. 6 is a structure diagram of a first embodiment of a blockchain-based secure transaction system of the present invention.

As shown in FIG. 6 which is a structure diagram of one embodiment of a blockchain-based secure transaction system of the present invention, the system includes a writing module 101, a first encryption module 107, a second encryption module 108, and a decryption module 102.

The writing module 101 is configured for writing a digital certificate into an intelligent contract of a blockchain corresponding to an asset type to be supervised, so that all institutions with asset accounts under the asset type can obtain a first public key of the supervisor through the digital certificate.

In this embodiment, the supervisor writes the digital certificate issued thereto by Certificate Authority (CA) into the intelligent contract of the blockchain corresponding to the asset type to be supervised. There are multiple asset types. For example, there are current assets and long-term assets according to consumption period, and long-term assets can be further classified according to the specific form; there are tangible assets and intangible assets based on whether there is a physical form; or by combining several classification standards, assets can be divided into current assets, long-term investments, fixed assets, intangible assets, deferred assets and the like, and the asset type to be supervised is selected from these asset types.

After the supervisor writes the digital certificate into the intelligent contract of the blockchain corresponding to the asset type to be supervised, all users or institutions (e.g., financial institutions and fund institutions) with asset accounts under the asset type to be supervised can obtain the first public key of the supervisor through the digital certificate written in the intelligent contract, and the first public key is configured for homomorphic encryption.

In addition, before the supervisor writes the digital certificate into the intelligent contract of the blockchain corresponding to the asset type to be supervised, CA signs on the basis of the first public key corresponding to the supervisor and the predetermined key exchange protocol, so as to generate the digital certificate and issue the digital certificate to the supervisor.

The first encryption module 107 is configured for generating an additive homomorphic key corresponding to each asset account based on each asset account managed by the current institution, a predetermined key exchange protocol and the first public key according to the key exchange protocol, encrypting the balance of each asset account by using the corresponding additive homomorphic key, and broadcasting the encrypted balance to each node of the blockchain through the intelligent contract of the blockchain.

In this embodiment, the first encryption module 107 may be disposed on the institution equipment of the institution. Due to the fact that each asset account corresponds to the predetermined key exchange protocol, each asset account and the predetermined key exchange protocol both have a corresponding public-private key pair. The institution equipment of the institution generates the additive homomorphic key corresponding to each asset account according to the key exchange protocol based on the public-private key pair corresponding to each asset account and the predetermined key exchange protocol (e.g., Diffie-Hellman protocol, national secret SM2 protocol) and the first public key of the supervisor. Specifically, the public-private key pair is first obtained, then a private key in the public-private key pair is obtained, and the additive homomorphic key corresponding to each asset account is generated based on the private key and the first public key of the supervisor according to the key exchange protocol, wherein the additive homomorphic key is used as an encryption and decryption key of homomorphic encryption, and the additive homomorphic key is a symmetric key (i.e., both parties sending and receiving data must use the same key to encrypt and decrypt plaintext).

The institution uses the corresponding additive homomorphic key to encrypt the balance of each asset account. For example, if a user or institution has two accounts b1 and b2 under the asset type to be supervised, the balance of the account b1 is encrypted using the additive homomorphic key corresponding to the account b1, and the balance of the account b2 is encrypted using the additive homomorphic key corresponding to the account b2. Finally, the institution informs each node of the blockchain of the balance, after homomorphic encryption, of each account under the asset type to be supervised through the intelligent contract of the blockchain, specifically, the balance after homomorphic encryption is written to a shared asset book on each node of the blockchain through the intelligent contract of the blockchain.

After homomorphic encryption of the balance of each asset account, only the supervisor with the additive homomorphic key and the asset owner can know the balance of the corresponding asset account. The asset account can be regarded as an old user and corresponds to a new user described below.

The second encryption module 108 is configured for encrypting the balance of the new account of a transactor for transaction through the corresponding additive homomorphic key when the institution initiates a transaction, and broadcasting the encrypted balance of the new account to each node of the blockchain through the intelligent contract of the blockchain.

In this embodiment, the user or institution can create a new asset account for transaction, and the created new asset account is called the new account in this embodiment. For example, during transaction, bank x changes 100 bills on an account number 001 to 400 bills, and the user or institution can deposit 400 on an account number 002 and then create a new account 003 on which −300 is deposited. The account number 002 is an asset account with the account balance being subjected to homomorphic encryption and is regarded as an old account as described above, and the account number 003 is a new account the balance of which is also subjected to homomorphic encryption.

In this embodiment, the second encryption module 108 is disposed on the institution equipment of the institution. When a user or institution in the blockchain initiates a transaction under the above-mentioned asset type, for example, A transfers money to B, the user or institution performs homomorphic encryption on the balance of the new account for transaction by each transactor through the additive homomorphic key corresponding to the asset account of each transactor, and broadcasts the balance of the new account for transaction by each transactor after homomorphic encryption to each node of the blockchain through the intelligent contract, so that other users or institutions on each node of the blockchain can be aware of the transaction (but cannot know the balance of the new account for transaction).

The decryption module 102 is configured for obtaining a public key in the public-private key pair corresponding to the new account, generating an additive homomorphic key according to the key exchange protocol based on a supervision private key corresponding to the supervisor and the predetermined key exchange protocol and the public key in the public-private key pair, and decrypting the encrypted balance of the new account by using the generated additive homomorphic key when the supervisor checks the balance of the new account of the transactor.

In this embodiment, the user or institution can create a new asset account for transaction, and the created new asset account is called the new account in this embodiment. For example, during transaction, bank x changes 100 bills on an account number 001 to 400 bills, and the user or institution can deposit 400 on an account number 002 and then create a new account 003 on which −300 is deposited. The account number 002 is an asset account with the account balance being subjected to homomorphic encryption and is regarded as an old account as described above, and the account number 003 is a new account the balance of which is also subjected to homomorphic encryption.

When the supervisor needs to check the balance of the new account of a transactor, the supervisor obtains the public key in the public-private key pair corresponding to the new account of the transactor, for example, the supervisor can obtain the broadcasted public key in the public-private key pair corresponding to the new account of the transactor through the intelligent contract, or the public key itself is a predetermined portion of the corresponding account number (e.g., the public key may be the N1-N2 number segment of the corresponding account number, and N1 and N2 are both natural numbers greater than 0). Then the additive homomorphic key is generated according to the key exchange protocol by means of the supervision private key corresponding to the supervisor and the predetermined key exchange protocol and the public key, and the generated additive homomorphic key can decrypt the balance of the new account.

In a preferred embodiment, during transaction, the transactor may also use an existing account for transaction instead of creating a new account, in this case, the balance encrypted by the second encryption module 108 may be a new balance of the existing account after transaction, and correspondingly, the balance decrypted by the decryption module 102 is a new balance of the existing account after transaction. In this embodiment, the encryption process of the new balance by the second encryption module 108 and the decryption process of the new balance by the decryption module 102 are consistent with those in the embodiment shown in FIG. 5, and will not be described in detail here.

Figure 7:
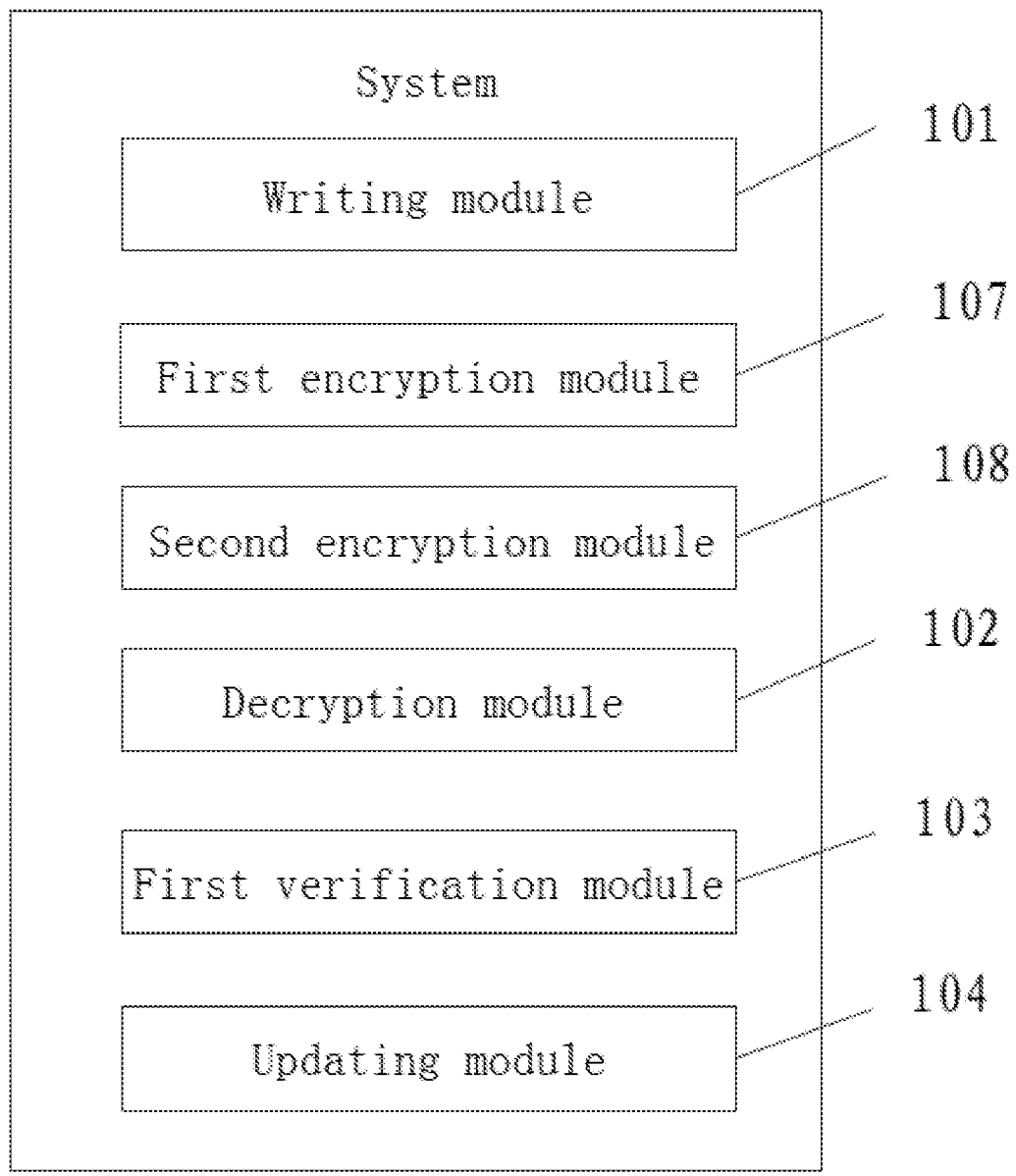
FIG. 7 is a structure diagram of a second embodiment of the blockchain-based secure transaction system of the present invention.

In a preferred embodiment, as shown in FIG. 7, on the basis of the above embodiment shown in FIG. 6, the system further includes:

a first verification module 103 configured for initiating the intelligent contract corresponding to each node for sum verification after the nodes of the blockchain receive the broadcasted encrypted balance of the new account corresponding to each transactor; and an updating module 104 which allows the intelligent contract corresponding to each node to update data based on the encrypted balance of the new account corresponding to each transactor if the sum verification, by the intelligent contract corresponding to each node, of the encrypted balance of the new account corresponding to each transactor succeeds.

In this embodiment, sum verification is to verify whether the sum of the balances of all nodes before transaction is equal to the sum of the balances of all nodes after transaction. For example, there is an effective algorithm $\oplus$ such that $E(x+y)=E(x)\oplus E(y)$ or $x+y=D(E(x)\oplus E(y))$ is true, wherein the effective algorithm is an additive homomorphic encryption verification algorithm which does not leak the balance x and y of the account while sum verification of the account is achieved.

If the sum verification, by the intelligent contract corresponding to each node, of the encrypted balance of the new account corresponding to each transactor succeeds, the intelligent contract corresponding to each node updates data based on the encrypted balance of the new account corresponding to each transactor.

Preferably, a sending module is further provided for sending a notification of sum verification failure to each node participating in the sum verification, or sending a notification of sum verification failure to all nodes on the blockchain if the sum verification, by the intelligent contract corresponding to a certain node, of the encrypted balance of the new account corresponding to a certain transactor fails.

Figure 8:
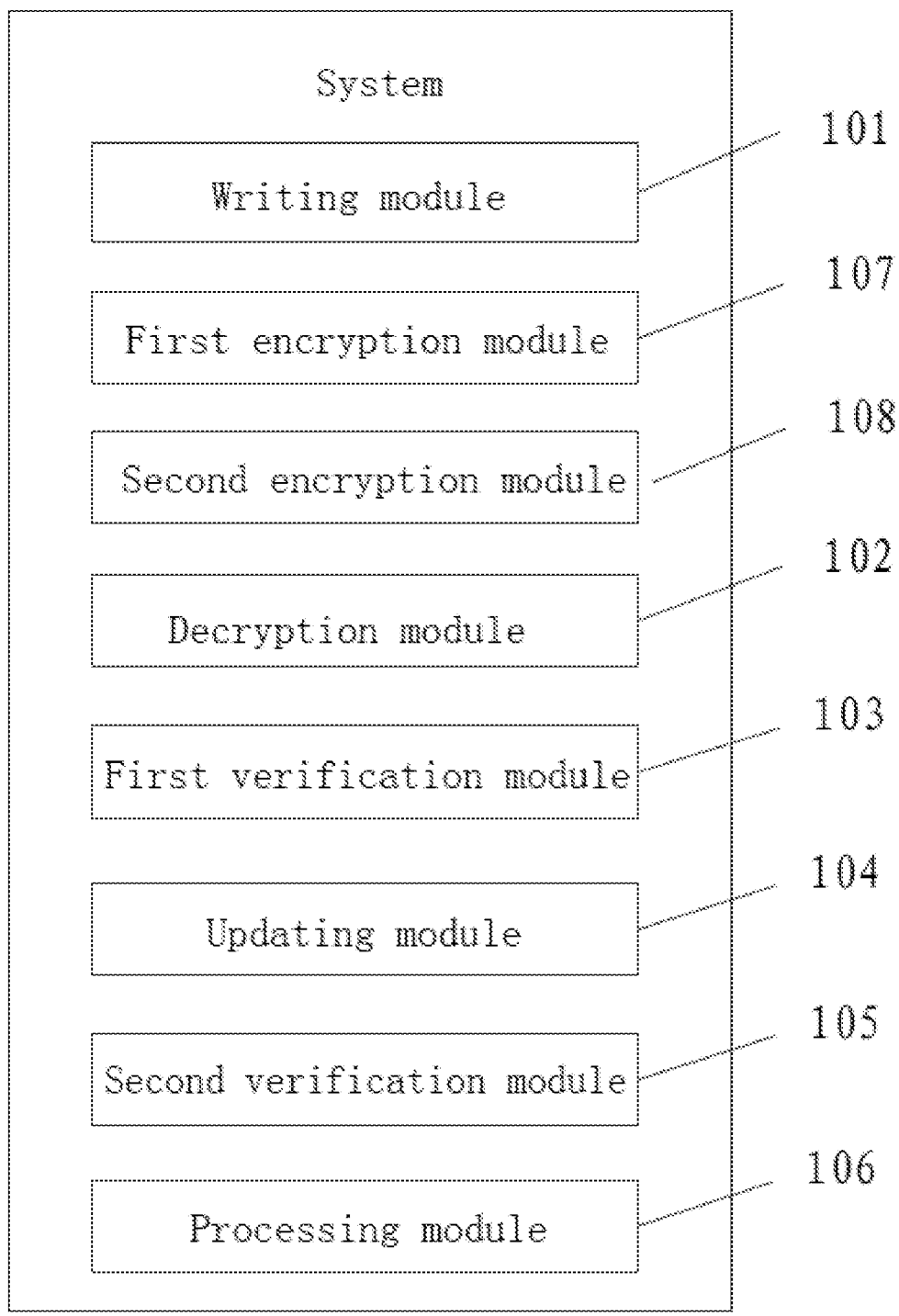
FIG. 8 is a structure diagram of a third embodiment of the blockchain-based secure transaction system of the present invention.

In a preferred embodiment, as shown in FIG. 8, on the basis of the above embodiment shown in FIG. 7, the system further includes:

a second verification module 105 configured for enabling a negative balance verification system for negative balance verification of the decrypted balance of the new account corresponding to each transactor after the supervisor decrypts the encrypted balance of the new account; and a processing module 106 which allows the supervisor to notify other nodes except the corresponding abnormal node of the account which fails the negative balance verification if an asset account fails the negative balance verification, and/or, allows the supervisor to cancel the transaction authority of the account which fails the negative balance verification on the blockchain through a blockchain authority management system if an asset account fails the negative balance verification.

In this embodiment, since the account and the amount of each transaction participated by the same node are recorded, false balance verification can effectively prevent a user from changing the balance of a certain sub-account by sharing balance among sub-accounts at a certain node, thus cheating in the sum verification, for example, a user can cheat in the verification by creating an account number with negative numbers: bank x changes 100 bills on an account number 001 to 400 bills: the user can create an account number 002 and deposit 400 on the account number 002, and then deposit −300 on a new account number 003; thus the negative balance verification is required.

If the sum verification, by the intelligent contract corresponding to each node, of the encrypted balance of the new account corresponding to each transactor succeeds, the supervisor decrypts the encrypted balance of the new account corresponding to each transactor, and after decryption, the negative balance verification system is enabled for negative balance verification of the decrypted balance of the new account corresponding to each transactor; if an account fails the negative balance verification, the supervisor determines the account, and notifies other nodes except the abnormal blockchain node of the abnormal condition of the account, and/or, if an account fails the negative balance verification, the supervisor cancels the transaction authority of the abnormal account on the blockchain through the blockchain authority management system.

The above description is only preferred embodiments of the present invention and is not intended to limit the present invention. Any modifications, equivalent substitutions, improvements, etc. made within the spirit and principles of the present invention should be included within the scope of the present invention.

What is claimed is:

1. A blockchain-based secure transaction method, the blockchain-based secure transaction method comprising:

S1, writing, by a supervisor, a digital certificate into an intelligent contract of a blockchain corresponding to an asset type to be supervised, so that all institutions with asset accounts under the asset type can obtain a first public key of the supervisor through the digital certificate;

S2, based on a public-private key pair corresponding to each asset account managed by an institution, a predetermined key exchange protocol and the first public key, generating an additive homomorphic key corresponding to each asset account according to the key exchange protocol, encrypting the balance of each asset account by using the corresponding additive homomorphic key, and broadcasting the encrypted balance to the intelligent contract of each node of the blockchain through the intelligent contract of the blockchain, by an institution equipment of the institution;

S3, the institution initiating a transaction, encrypting the balance of a new account of a transactor for transaction through the corresponding additive homomorphic key, and broadcasting the encrypted balance of the new account to the intelligent contract of each node of the blockchain through the intelligent contract of the blockchain, by the institution equipment; and S4, checking the balance of the new account of the transactor, obtaining a public key in the public-private key pair corresponding to the new account, generating an additive homomorphic key according to the key exchange protocol based on a supervision private key corresponding to the supervisor and the predetermined key exchange protocol and the public key in the public-private key pair, and decrypting the encrypted balance of the new account by using the generated additive homomorphic key, by the supervisor.

2. The blockchain-based secure transaction method according to claim 1, wherein S3 and S4 are replaced by:

S10, the institution initiating a transaction, encrypting the new balance of an asset account of a transactor for transaction through the corresponding additive homomorphic key, and broadcasting the encrypted new balance to the intelligent contract of each node of the blockchain through the intelligent contract of the blockchain, by the institution equipment; and S11, checking the new balance of the asset account of the transactor, obtaining a public key in the public-private key pair corresponding to the asset account, generating an additive homomorphic key according to the key exchange protocol based on a supervision private key corresponding to the supervisor and the predetermined key exchange protocol and the public key in the public-private key pair, and decrypting the encrypted new balance by using the generated additive homomorphic key, by the supervisor.

3. The blockchain-based secure transaction method according to claim 2, wherein S3 is followed by:

S5, the nodes of the blockchain receiving the broadcasted encrypted balance of the new account corresponding to each transactor, initiating the intelligent contract corresponding to each node for sum verification; and S6, by the intelligent contract corresponding to each node, of the encrypted balance of the new account corresponding to each transactor succeeds, updating, by the intelligent contract corresponding to each node, data based on the encrypted balance of the new account corresponding to each transactor.

4. The blockchain-based secure transaction method according to claim 3, wherein S5 is followed by:

S7, by the intelligent contract corresponding to a certain node, of the encrypted balance of the new account corresponding to a certain transactor fails, sending a notification of sum verification failure to each node participating in the sum verification, or sending a notification of sum verification failure to all nodes on the blockchain.

5. The blockchain-based secure transaction method according to claim 3, wherein S6 is followed by:

S8, the supervisor decrypting the encrypted balance of the new account, enabling a negative balance verification system for negative balance verification of the encrypted balance of the new account corresponding to each transactor; and S9, an asset account failing the negative balance verification, notifying, by the supervisor, other nodes except the corresponding abnormal node of the account which fails the negative balance verification, and/or canceling, by the supervisor, the transaction authority of the account which fails the negative balance verification on the blockchain through a blockchain authority management system.

6. The blockchain-based secure transaction method according to claim 1, wherein the digital certificate is generated after Certification Authority (CA) signs on the basis of the first public key corresponding to the supervisor and the predetermined key exchange protocol and is issued to the supervisor.

7. The blockchain-based secure transaction method according to claim 6, wherein S3 is followed by:

S5, the nodes of the blockchain receiving the broadcasted encrypted balance of the new account corresponding to each transactor, initiating the intelligent contract corresponding to each node for sum verification; and S6, by the intelligent contract corresponding to each node, of the encrypted balance of the new account corresponding to each transactor succeeds, updating, by the intelligent contract corresponding to each node, data based on the encrypted balance of the new account corresponding to each transactor.

8. An electronic device, the electronic device comprising a memory and a processor connected with the memory, wherein the memory stores a blockchain-based secure transaction system which can run on the processor, and the blockchain-based secure transaction system implements the following steps when executed by the processor:

S1, writing, by a supervisor, a digital certificate into an intelligent contract of a blockchain corresponding to an asset type to be supervised, so that all institutions with asset accounts under the asset type can obtain a first public key of the supervisor through the digital certificate;

S2, based on a public-private key pair corresponding to each asset account managed by an institution, a predetermined key exchange protocol and the first public key, generating an additive homomorphic key corresponding to each asset account according to the key exchange protocol, encrypting the balance of each asset account by using the corresponding additive homomorphic key, and broadcasting the encrypted balance to the intelligent contract of each node of the blockchain through the intelligent contract of the blockchain, by an institution equipment of the institution;

S3, when the institution initiates a transaction, encrypting the balance of a new account of a transactor for transaction through the corresponding additive homomorphic key, and broadcasting the encrypted balance of the new account to the intelligent contract of each node of the blockchain through the intelligent contract of the blockchain, by the institution equipment; and S4, when checking the balance of the new account of the transactor, obtaining a public key in the public-private key pair corresponding to the new account, generating an additive homomorphic key according to the key exchange protocol based on a supervision private key corresponding to the supervisor and the predetermined key exchange protocol and the public key in the public-private key pair, and decrypting the encrypted balance of the new account by using the generated additive homomorphic key, by the supervisor.

9. The electronic device according to claim 8, wherein S3 and S4 are replaced by:

S10, when the institution initiates a transaction, encrypting the new balance of an asset account of a transactor for transaction through the corresponding additive homomorphic key, and broadcasting the encrypted new balance to the intelligent contract of each node of the blockchain through the intelligent contract of the blockchain, by the institution equipment; and S11, when checking the new balance of the asset account of the transactor, obtaining a public key in the public-private key pair corresponding to the asset account, generating an additive homomorphic key according to the key exchange protocol based on a supervision private key corresponding to the supervisor and the predetermined key exchange protocol and the public key in the public-private key pair, and decrypting the encrypted new balance by using the generated additive homomorphic key, by the supervisor.

10. The electronic device according to claim 9, wherein the blockchain-based secure transaction system also implements the following steps when executed by the processor:

S5, after the nodes of the blockchain receive the broadcasted encrypted balance of the new account corresponding to each transactor, initiating the intelligent contract corresponding to each node for sum verification; and S6, if the sum verification, by the intelligent contract corresponding to each node, of the encrypted balance of the new account corresponding to each transactor succeeds, updating, by the intelligent contract corresponding to each node, data based on the encrypted balance of the new account corresponding to each transactor.

11. The electronic device according to claim 10, wherein the blockchain-based secure transaction system also implements the following steps when executed by the processor:

S7, if the sum verification, by the intelligent contract corresponding to a certain node, of the encrypted balance of the new account corresponding to a certain transactor fails, sending a notification of sum verification failure to each node participating in the sum verification, or sending a notification of sum verification failure to all nodes on the blockchain.

12. The electronic device according to claim 10, wherein the blockchain-based secure transaction system also implements the following steps when executed by the processor:

S8, after the supervisor decrypts the encrypted balance of the new account, enabling a negative balance verification system for negative balance verification of the encrypted balance of the new account corresponding to each transactor; and S9, if an asset account fails the negative balance verification, notifying, by the supervisor, other nodes except the corresponding abnormal node of the account which fails the negative balance verification, and/or, if an asset account fails the negative balance verification, canceling, by the supervisor, the transaction authority of the account which fails the negative balance verification on the blockchain through a blockchain authority management system.

13. The blockchain-based electronic device according to claim 8, wherein the digital certificate is generated after Certification Authority (CA) signs on the basis of the first public key corresponding to the supervisor and the predetermined key exchange protocol and is issued to the supervisor.

14. The electronic device according to claim 13, wherein the blockchain-based secure transaction system also implements the following steps when executed by the processor:

S5, after the nodes of the blockchain receive the broadcasted encrypted balance of the new account corresponding to each transactor, initiating the intelligent contract corresponding to each node for sum verification; and S6, if the sum verification, by the intelligent contract corresponding to each node, of the encrypted balance of the new account corresponding to each transactor succeeds, updating, by the intelligent contract corresponding to each node, data based on the encrypted balance of the new account corresponding to each transactor.

15. A non-transitory computer-readable storage medium, wherein a blockchain-based secure transaction system is stored on the computer-readable storage medium, and when executed by a processor, the blockchain-based secure transaction system implements the following steps:

S1, writing, by a supervisor, a digital certificate into an intelligent contract of a blockchain corresponding to an asset type to be supervised, so that all institutions with asset accounts under the asset type can obtain a first public key of the supervisor through the digital certificate;

S2, based on a public-private key pair corresponding to each asset account managed by an institution, a predetermined key exchange protocol and the first public key, generating an additive homomorphic key corresponding to each asset account according to the key exchange protocol, encrypting the balance of each asset account by using the corresponding additive homomorphic key, and broadcasting the encrypted balance to the intelligent contract of each node of the blockchain through the intelligent contract of the blockchain, by an institution equipment of the institution;

S3, when the institution initiates a transaction, encrypting the balance of a new account of a transactor for transaction through the corresponding additive homomorphic key, and broadcasting the encrypted balance of the new account to the intelligent contract of each node of the blockchain through the intelligent contract of the blockchain, by the institution equipment; and S4, when checking the balance of the new account of the transactor, obtaining a public key in the public-private key pair corresponding to the new account, generating an additive homomorphic key according to the key exchange protocol based on a supervision private key corresponding to the supervisor and the predetermined key exchange protocol and the public key in the public-private key pair, and decrypting the encrypted balance of the new account by using the generated additive homomorphic key, by the supervisor.

16. The non-transitory computer-readable storage medium according to claim 15, wherein S3 and S4 are replaced by:

S10, when the institution initiates a transaction, encrypting the new balance of an asset account of a transactor for transaction through the corresponding additive homomorphic key, and broadcasting the encrypted new balance to the intelligent contract of each node of the blockchain through the intelligent contract of the blockchain, by the institution equipment; and S11, when checking the new balance of the asset account of the transactor, obtaining a public key in the public-private key pair corresponding to the asset account, generating an additive homomorphic key according to the key exchange protocol based on a supervision private key corresponding to the supervisor and the predetermined key exchange protocol and the public key in the public-private key pair, and decrypting the encrypted new balance by using the generated additive homomorphic key, by the supervisor.

17. The non-transitory computer-readable storage medium according to claim 16, wherein the blockchain-based secure transaction system also implements the following steps when executed by the processor:

S5, after the nodes of the blockchain receive the broadcasted encrypted balance of the new account corresponding to each transactor, initiating the intelligent contract corresponding to each node for sum verification; and S6, if the sum verification, by the intelligent contract corresponding to each node, of the encrypted balance of the new account corresponding to each transactor succeeds, updating, by the intelligent contract corresponding to each node, data based on the encrypted balance of the new account corresponding to each transactor.

18. The non-transitory computer-readable storage medium according to claim 17, wherein the blockchain-based secure transaction system also implements the following steps when executed by the processor:

S7, if the sum verification, by the intelligent contract corresponding to a certain node, of the encrypted balance of the new account corresponding to a certain transactor fails, sending a notification of sum verification failure to each node participating in the sum verification, or sending a notification of sum verification failure to all nodes on the blockchain.

19. The non-transitory computer-readable storage medium according to claim 17, wherein the blockchain-based secure transaction system also implements the following steps when executed by the processor:

S8, after the supervisor decrypts the encrypted balance of the new account, enabling a negative balance verification system for negative balance verification of the encrypted balance of the new account corresponding to each transactor; and S9, if an asset account fails the negative balance verification, notifying, by the supervisor, other nodes except the corresponding abnormal node of the account which fails the negative balance verification, and/or, if an asset account fails the negative balance verification, canceling, by the supervisor, the transaction authority of the account which fails the negative balance verification on the blockchain through a blockchain authority management system.

20. The non-transitory computer-readable storage medium according to claim 15, wherein the digital certificate is generated after Certification Authority (CA) signs on the basis of the first public key corresponding to the supervisor and the predetermined key exchange protocol and is issued to the supervisor.

* * * * *